(12) United States Patent
Tracy et al.

(10) Patent No.: US 7,000,870 B2
(45) Date of Patent: Feb. 21, 2006

(54) LAMINAR FLOW WING FOR TRANSONIC CRUISE

(75) Inventors: Richard R. Tracy, Carson City, NV (US); James D. Chase, Reno, NV (US); Ilan Kroo, Stanford, CA (US)

(73) Assignee: Aerion Corporation, Reno, NV (US)

( * ) Notice: Subject to any disclaimer, the term of this patent is extended or adjusted under 35 U.S.C. 154(b) by 187 days.

(21) Appl. No.: 10/693,411

(22) Filed: Oct. 23, 2003

(65) Prior Publication Data

US 2004/0129837 A1    Jul. 8, 2004

Related U.S. Application Data

(60) Provisional application No. 60/424,039, filed on Nov. 7, 2002.

(51) Int. Cl.
*B64C 1/38* (2006.01)
(52) U.S. Cl. .................... 244/130; 244/35 A; 244/204
(58) Field of Classification Search ............... 244/130, 244/36, 35 A, 35 R, 204, 45 R, 218
See application file for complete search history.

(56) References Cited

U.S. PATENT DOCUMENTS

| | | | | |
|---|---|---|---|---|
| 2,709,052 A | * | 5/1955 | Berg | 244/35 R |
| D179,348 S | * | 12/1956 | Johnson | D12/337 |
| 5,322,242 A | * | 6/1994 | Tracy | 244/36 |
| 5,518,204 A | * | 5/1996 | Tracy | 244/36 |
| 5,842,666 A | * | 12/1998 | Gerhardt et al. | 244/15 |
| 5,897,076 A | * | 4/1999 | Tracy | 244/117 A |
| 6,149,101 A | * | 11/2000 | Tracy | 244/130 |

* cited by examiner

*Primary Examiner*—Peter M. Poon
*Assistant Examiner*—Timothy D. Collins
(74) *Attorney, Agent, or Firm*—William W. Haefliger

(57) ABSTRACT

In combination, an aircraft wing and fuselage, comprising the wing having camber at or near the wing leading edge which has blunted sharpness and low sweep angle, and the fuselage having indentation along the wing side thereof, and lengthwise of the fuselage.

15 Claims, 5 Drawing Sheets

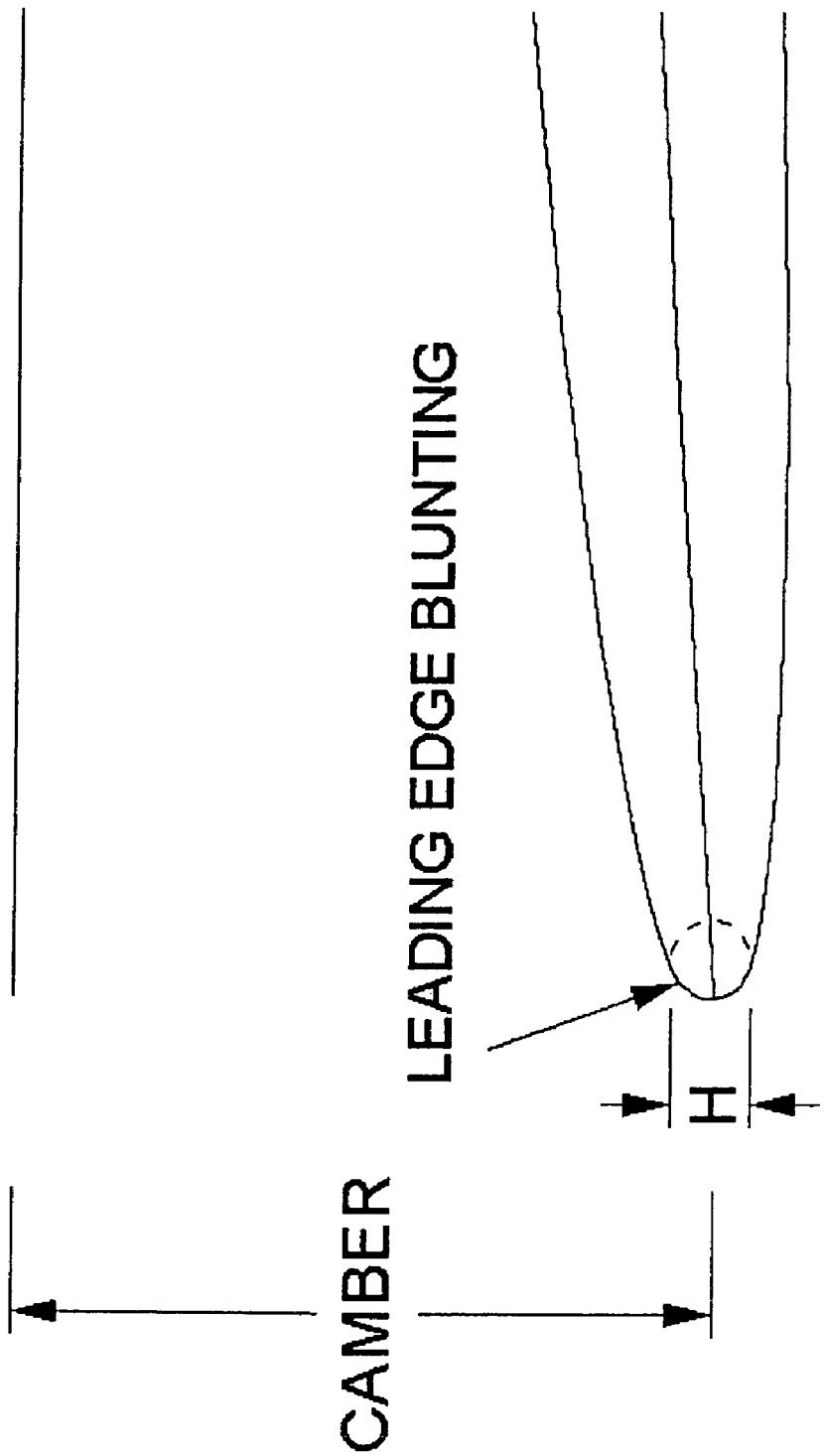

LAMINAR FLOW WING FOR TRANSONIC CRUISE

This application claims priority from provisional application Ser. No. 60/424,039 filed Nov. 7, 2002.

BACKGROUND OF THE INVENTION

This invention relates generally to an aircraft wing adapted for subsonic cruise conditions very near Mach One, and more particularly to a laminar wing adapted for such transonic cruise conditions.

Modern subsonic aircraft designed for efficient cruise at high subsonic speed have moderate to highly swept wings (30° to 45°) with moderately high aspect ratio (5 to 8), supercritical airfoils and t/c (thickness/chord) ratios as thin as possible, typically about 10 to 12% for structural weight considerations.

The latest fighters on the other hand, have much thinner airfoils, typically about 3 to 5% t/c as a compromise in order to also have supersonic dash capability, with similar leading edge sweep, but low aspect ratio (3 to 5), such that the trailing edge is nearly unswept.

Prior patent art of one of the present inventors (Tracy) describes a wing for efficient supersonic cruise which has a relatively unswept ($\leq 30°$) and sharp "supersonic" leading edge, and t/c less than about 2% as a spanwise average, except in the immediate vicinity of the area-ruled fuselage. See U.S. Patents listed below. This wing achieves lower supersonic drag compared to the typical swept or delta wing traditionally selected for efficient supersonic cruise by achieving extensive areas of laminar boundary layer coverage, which provide nearly an order of magnitude reduction in associated skin friction. The extremely low thickness is required to limit wave drag due to thickness to acceptable levels, and necessitates a low aspect ratio (2.5 to 3) for structural weight reasons. The sharp-edged airfoil is biconvex or a minor modification thereof for low wave drag due to thickness and favorable pressure gradient. The low sweep is necessary to limit boundary layer crossflow to "subcritical levels" to prevent premature transition from laminar to turbulent boundary layer flow caused by so-called crossflow instability.

SUMMARY OF THE INVENTION

It is a major object of the invention to provide an improved aircraft wing adapted for aircraft transonic cruise conditions. The wing improves over the wings described in Tracy U.S. Pat. Nos. 6,149,101 and 5,897,076, and is useful for provision of improved transonic cruise efficiency, slightly below Mach 1. The wing is further characterized by more efficient cruise at higher subsonic speeds than can be achieved with the highly swept wings presently used for high subsonic cruise speeds.

A further object is to provide an aircraft wing and fuselage comprising a) said wing having camber (downward curvature) at or near the wing leading edge which has blunted sharpness, b) a fuselage having indentation along the wing side thereof, and lengthwise of the fuselage, The fuselage and other components are typically "area-ruled" for a speed near Mach 1, (e.g. Mach 0.95), rather than for cruise at a supersonic Mach number as was done in the Tracy patent disclosing a wing for supersonic cruise aircraft. In addition the thickness-chord ratio is optimized for the transonic cruise condition. The thickness ratio is somewhat greater than the 2% average (along the span) of the supersonic wing, but still much less than that of the swept wings used for high subsonic speed flight.

The improved wing is further characterized by the following factors:

Much thinner than current subsonic cruise wings, and at 2 to 4% t/c is similar to or thinner than current fighters.

Much lower leading edge sweep than current fighters, and at about 20° sweep or less is similar to, or less swept than the Tracy previously patented laminarsupersonic wing.

Slightly blunted leading edge, and specially cambered and contoured airfoil (compared to the sharp, approximately biconvex supersonic airfoil of the prior Tracy patents).

Low to moderate aspect ratio as a compromise between weight and cruise efficiency.

Locally thickened inner portion associated with "area ruled" fuselage.

The airfoils are configured to create a "favorable" pressure gradient (pressure decreasing monotonically with distance aft from the leading edge) on the upper and lower surfaces over the maximum fraction of chord at the lift coefficients associated with the design cruise flight envelope, consistent with maximum practical critical Mach number at these conditions. Whereas the onset of compressibility generally creates local shock waves and unfavorable spanwise and chordwise pressure gradients causing transition on conventional subsonic laminar flow wings, the described wing utilizes the compressibility effect at transonic Mach numbers to enhance the favorable pressure gradients needed for extensive laminar flow. A secondary consideration is achieving the highest practical maximum stall lift coefficient for the trailing edge flap system selected. Leading edge flaps, or devices are not necessary but desirable if the device doesn't introduce a disturbance capable of causing premature boundary layer transition from laminarity to turbulence ("tripping" the boundary layer) when retracted at cruise conditions.

The reasons for improved efficiency and other benefits associated with the thin unswept wing compared to the highly swept wings currently used for high subsonic cruise include:

Reduced skin friction because of much more extensive laminar flow than possible with swept wings, as the result of low crossflow and extensive regions of favorable chordwise pressure gradient.

Onset of compressibility drag rise is "delayed" to higher subsonic Mach number with the very thin unswept wing, than for a typically thicker swept or delta wing.

The unswept wing has improved takeoff and landing performance in the form of a lower angle of attack than the swept wing, even if the latter has equal aspect ratio.

The combined result of such effects is that the increase in total inviscid drag coefficient due to compressibility effects is delayed to higher Mach number very near Mach One, for the thin unswept wing. Even more important, the thin unswept wing's extensive laminar flow near Mach one, which is not feasible for the swept wing, substantially reduces its skin friction drag, which is the key to its improved flight efficiency near Mach One compared to the delta or swept wings presently used for cruise at high subsonic speed.

Further characteristics are: fuselage indentation along the wing side, the wing at each side of the fuselage having generally trapezoidal configuration; the wing having camber at or near the wing leading edge, which has camber (droop)

and blunted sharpness for transonic cruise; said wing having maximum thicknesses to chord length ratio (t/c) which varies with location from the wing root to the tip, the ratio of said maximum thickness to chord length at said locations varying from about 3.5% near the root to about 1.5% near the tip; wing thickness tapers forwardly and rearwardly from the zone of maximum thickness, with generally convex upper and lower surfaces, designed to maintain a smooth, favorable (decreasing) pressure gradient from the preferably slightly blunted leading edge, as far aft along the wing as practical at design flight conditions; wing root length subtending fuselage indentation; wing leading edge sweep less than about 20 degrees, or as necessary to limit crossflow pressure gradients to levels which will not cause premature boundary layer flow transition from turbulent to laminar. Engines may be located in nacelles on either sides of the fuselage, or in association with the wing; or may be integrated into the fuselage. In any case the effect of such engines is taken into account when the aircraft is "area ruled" as referenced above.

Similar considerations apply to the tail surfaces of the aircraft, so as to achieve reduced drag and delay compressibility drag rise to higher subsonic speeds than possible with typically thicker, swept tail surfaces.

These and other objects and advantages of the invention, as well as the details of an illustrative embodiment, will be more fully understood from the following specification and drawings, in which:

DRAWING DESCRIPTION

Figure 8:
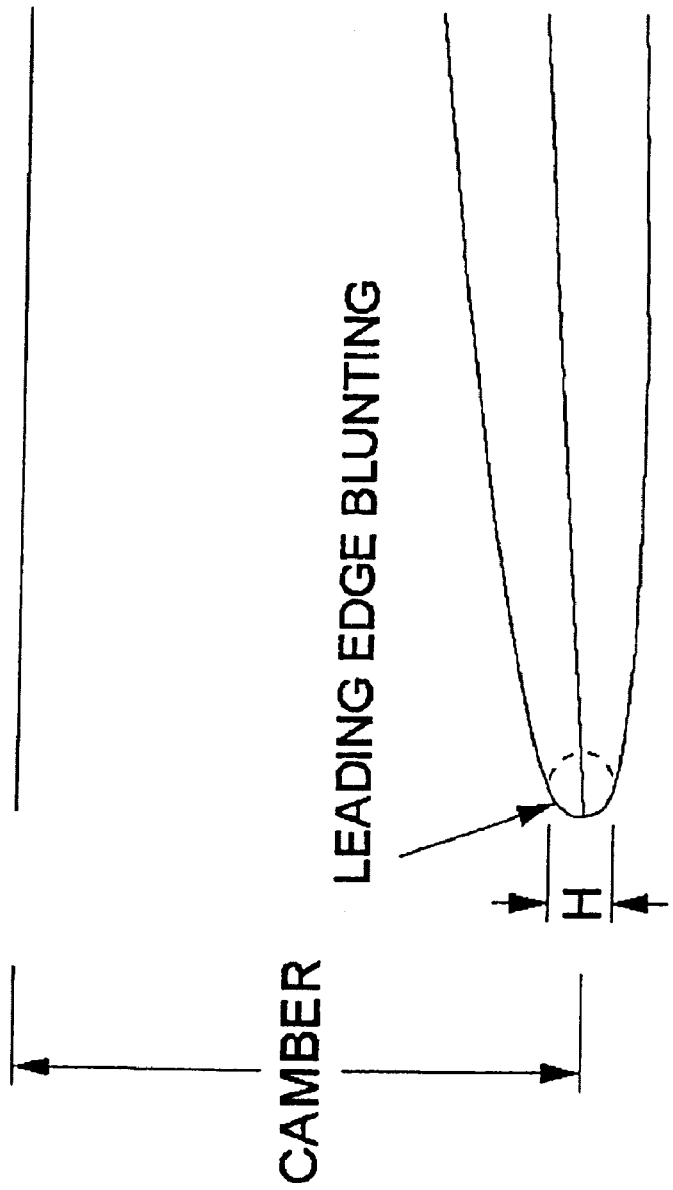

FIG. 8 magnifies the profile of the airfoil's slightly blunted leading edge.

DETAILED DESCRIPTION

In the drawings, an aircraft 10 incorporating the invention has a fuselage 11, a wing 12 defined by left and right wing sections 12*a* and 12*b*; a tail at 13 having left and right sections 13*a* and 13*b*, and a vertical section 13*c*; and jet engines within nacelles 14 and 15. The latter are located near the inboard ends of wing trailing edges 12*c* and 12*d* and forward of the tail 13, as shown. The fuselage has width $w_1$ at location 34 proximate the inboard ends of the wing leading edges 12*e* and 12*f*; and width $w_2$ at a location 35 proximate such inboard ends of the trailing edges 12*c* and 12*d*, where:

$w_1 > w_2$, and the fuselage width between nacelle locations 14 and 15 decreases as shown. The fuselage and tail have locations 16 and 17 near the leading an trailing edges, respectively of tail 13.

Figure 2:
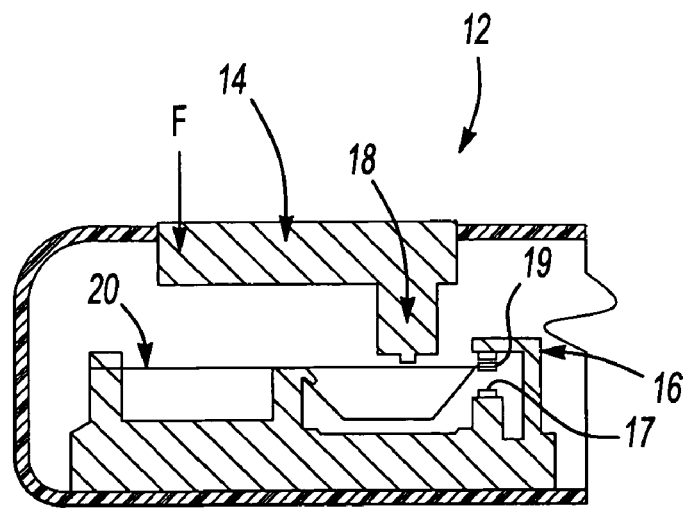
FIG. 2 is a graph with abscissa correlated to the FIG. 1 aircraft length.

FIG. 2 is a graph showing the aircraft cross sectional area, normal to the aircraft longitudinal axis. Note that between nacelle locations 14 and 15 (as referred to) the fuselage area decreases, with area contributions of the fuselage and wings as designated varying as shown at 18 and 19. Note also that between zones 33 and 22 (at or proximate the aft ends of the nacelles), the area contribution of the fuselage and nacelles vary as shown at 20 and 21. Note further that between zone 16 and 17 (as referred to) at or proximate the forward and aft ends of the tail, the area contribution of the fuselage and tail vary as shown at 24 and 25.

Figure 1:
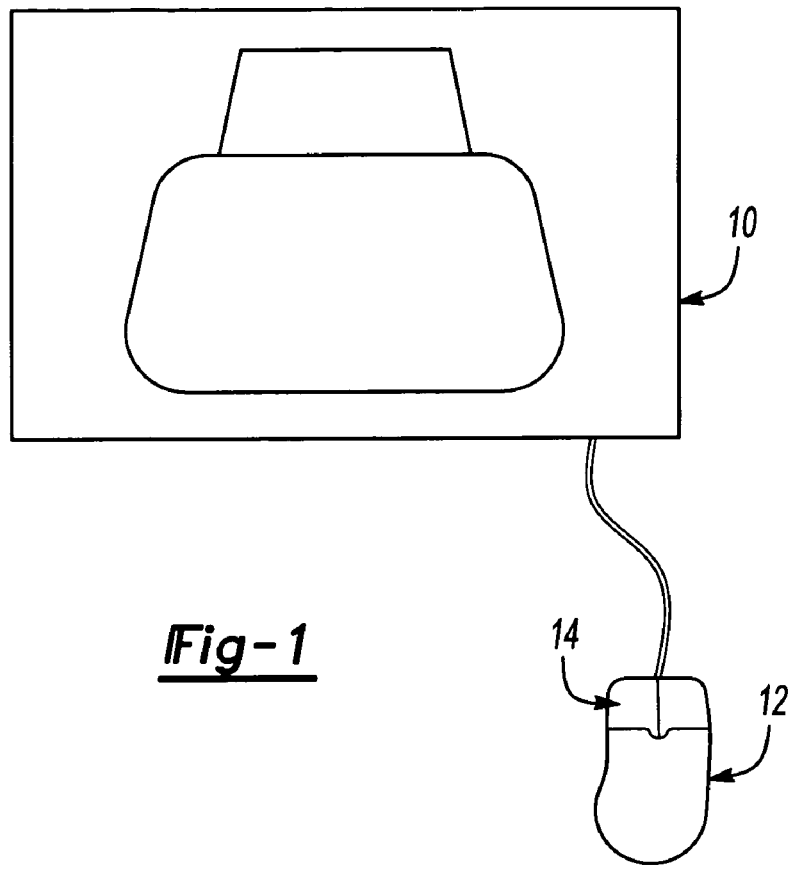
FIG. 1 is a plan view of an aircraft incorporating the invention.
Figure 3:
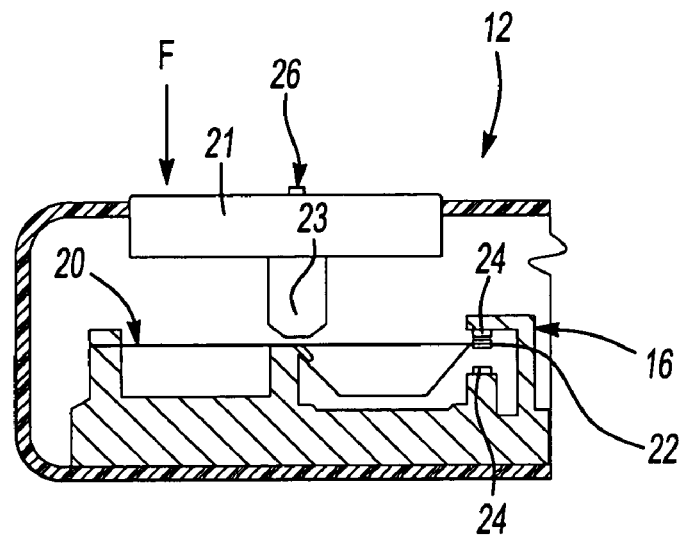
FIGS. 3–5 are airfoil sections taken on lines A—A, B—B and C—C, respectively of FIG. 1.

Referring to FIGS. 1 and 3, the wing airfoil section 12*g* at station A—A (chordwise section) is shown to have leading edge blunted sharpness at 26, with camber, for high subsonic cruise condition.

Figure 4:
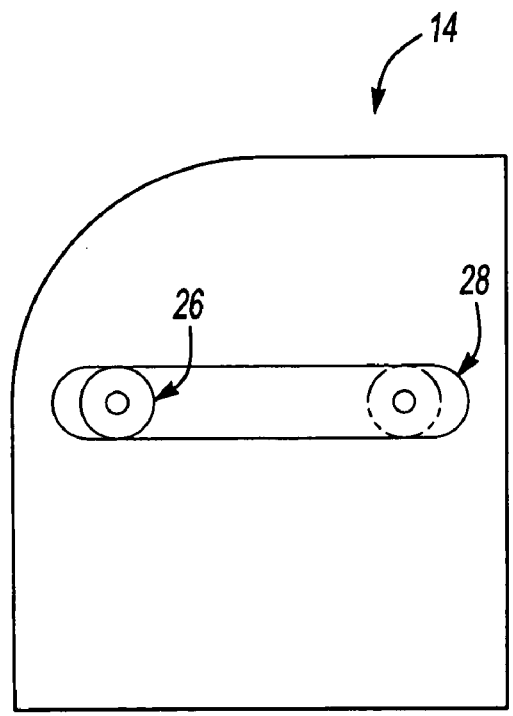
Figure 5:
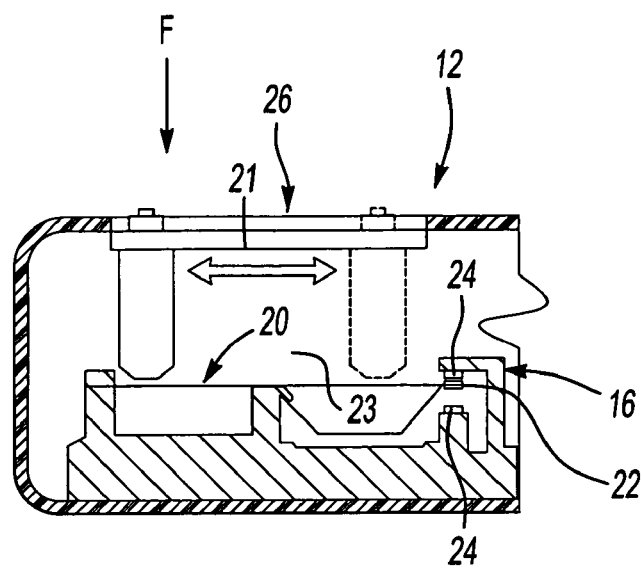

FIGS. 4 and 5 show the airfoil section 12*h* and 12*i* at stations B—B and C—C (chordwise sections) with leading edge blunted sharpness at 26' and 26", with camber, for high subsonic cruise.

Figure 6:
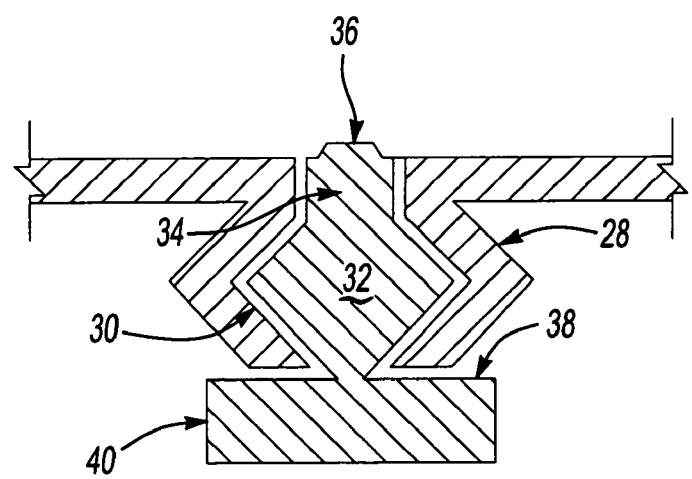
FIG. 6 is a graph comparing the drag characteristics of an aircraft incorporating the invention compared to a typical swept wing aircraft.
Figure 6:
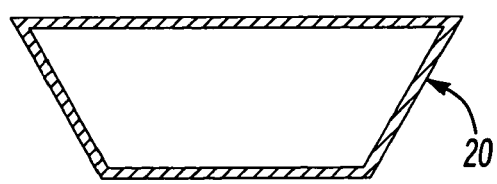

In FIG. 3, the maximum thickness to chord length ratio t/c is about 3.5%; that ratio in FIG. 4 is about 2.5%; and that ratio in FIG. 5 is about 1.5%. Analysis shows that a wing configured according to the present invention will have a drag characteristic vs. Mach number much superior to a current swept wing in the high subsonic regime between Mach 0.9 and 1.0, as shown in FIG. 6.

Figure 7:
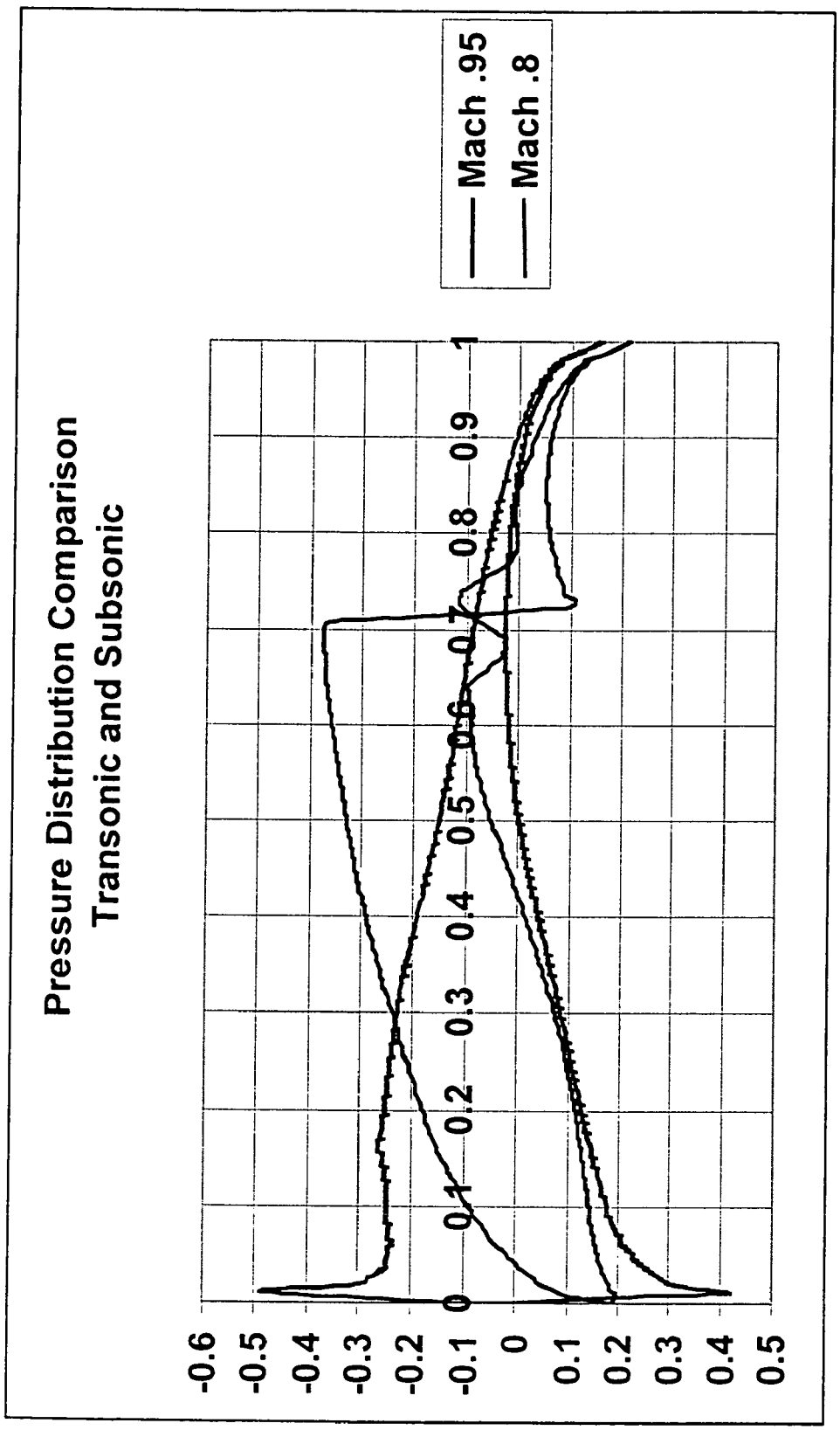
FIG. 7 is a graph illustrating the pressure distributions of an airfoil section of the aircraft incorporating the invention at two Mach numbers.
Figure 6:
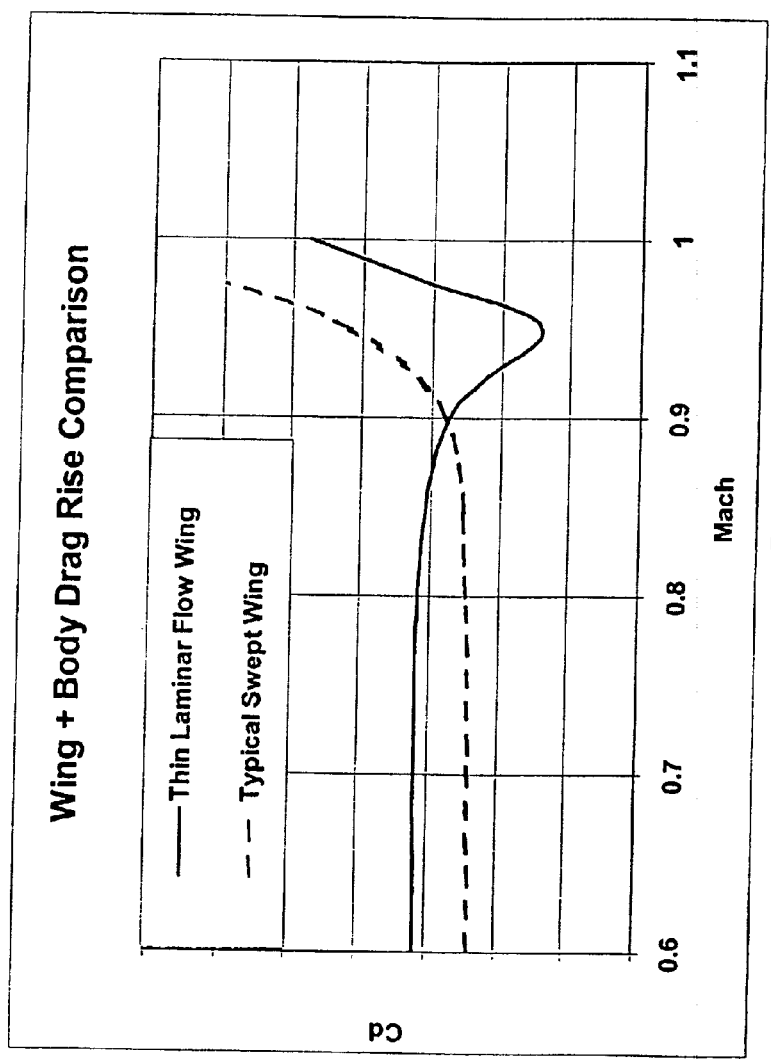
Figure 7:
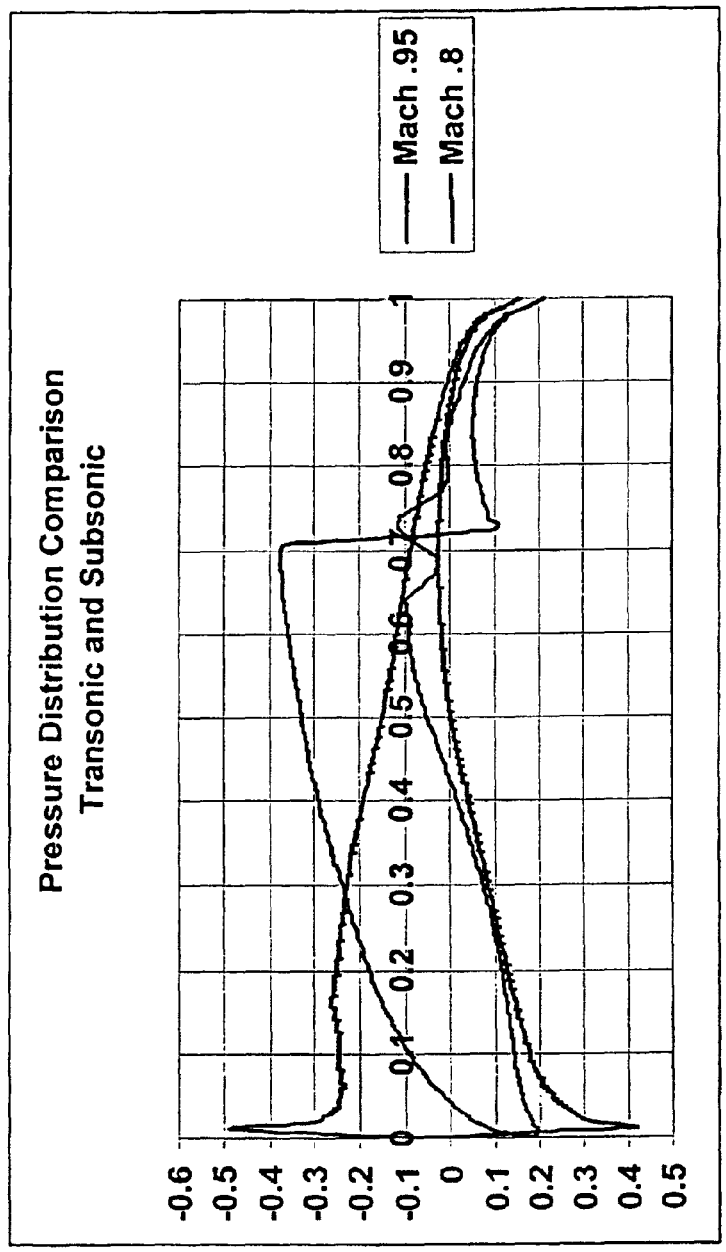

In FIG. 7, pressure distributions (in the form of pressure coefficients, with negative values representing pressures below ambient and positive values pressures above ambient) are shown for upper and lower surfaces for an airfoil section shown at sections A—A of FIG. 1. At Mach 0.8, below the design point of the wing, very sharp positive and negative pressure gradients are generated immediately aft of the leading edge. These sharp spikes in the pressure gradients would be expected to cause transition from laminar flow, at least on the upper surface (upper curve). As speed increases to the Mach 0.95 design point, however, the compressibility effect is seen to modify the pressures into the more gradual negative gradients needed to foster extensive laminar flow on both upper and lower surface aft to about 70% of chord for the case shown.

Reduced drag between Mach 0.8 and 0.95 is the result of increased laminar flow, made possible by extensive favorable pressure gradients on both upper and lower surfaces as shown in FIG. 7 for cruise at Mach 0.95. The drag increase above Mach 0.95 is caused by the increase in wave drag with Mach number overriding the drag reduction from the increasing extent of laminar flow.

FIG. 8, illustrates a magnification of the leading edge. The relative "bluntness" of the leading edge is related by the ratio of the leading edge diameter "H" to airfoil maximum thickness "t". The "h/t" ratio is small, with ranges from ½% to 3% which in conjunction with the contours behind the leading edge maintains acceptable chordwise pressure gradients.

We claim:

1. In combination, an aircraft wing and fuselage, comprising
    a) said wing having camber at or near the wing leading edge which has blunted sharpness,
    b) the wing having leading edge sweep less than about 20°,
    c) the wing having thickness to chord ratio less than about 3% as a spanwise average, and
    d) said fuselage having elongated outwardly concave indentations along the wing sides thereof, and lengthwise of the fuselage, e) said wing leading edge having blunted sharpness along substantially its entire length where the bluntness at each spanwise station is about ½% to 3% of the maximum airfoil thickness at said station, bluntness defined as h/t where h is the leading edge forward convexity diameter, and t is said maximum airfoil thickness.

2. The combination of claim 1 wherein the wing at each side of the fuselage including said indentation has generally trapezoidal configuration.

3. The combination of claim 1 wherein the wing has maximum thicknesses at locations along the wing from root to outer tip length, the ratio of said maximum thickness to chord length at said locations varying from about 3.5 to about 1.5.

4. The combination of claim 3 wherein at each of said locations the wing tapers forwardly and rearwardly from the zone of maximum thickness, with generally convex upper and lower surfaces designed to maintain a smooth, favorable pressure gradient from the slightly blunted leading edge condition, to aft locations along the wing at subsonic design flight conditions.

5. The combination of claim 1 wherein at each of said locations, the wing tapers forwardly and rearwardly from said zone of maximum thickness, throughout the wing length.

6. The combination of claim 1 wherein the wing at each side of the fuselage has a root length which subtends said indentation at said side.

7. The combination of claim 2 wherein the wing has leading edge sweep such as necessary to limit crossflow pressure gradients to levels which will not cause premature boundary layer transition at the design flight conditions.

8. In combination, an aircraft wing and fuselage, comprising
   a) said wing having maximum thickness extending spanwise, said maximum thickness decreasing from a primary wing zone proximate a fuselage indentation to a secondary wing zone at a selected distance from the fuselage centerline,
   b) said fuselage having indentations along the wing sides thereof, and lengthwise of the fuselage,
   c) said maximum thickness to chord ratio, t/c remaining less than about 3.5% from said secondary zone to the wing tip,
   c) the wing having a leading edge having blunted sharpness along substantially its entire length where the bluntness at each spanwise station is about ½% to 3% of the maximum airfoil thickness at said station, bluntness defined as h/t where h is the leading edge forward convexity diameter, and t is said maximum airfoil thickness.

9. The combination of claim 8 wherein said wing has camber at or near the wing leading edge.

10. The combination of claim 8 wherein the wing at each side of the fuselage including said indentation has trapezoidal configuration.

11. The combination of claim 9 including a tail at the aft end of the fuselage, there being engine nacelles at opposite sides of the fuselage, and located between the wing and tail.

12. The combination of claim 9 wherein said maximum thicknesses are associated with wing chord locations, at each of which the wing tapers forwardly and rearwardly, from the zone of maximum thickness with convex upper and lower surfaces designed to maintain a smooth, favorable pressure gradient from the slightly blunted leading edge, as far aft along the wings surface as feasible at subsonic design flight conditions.

13. The combination of claim 10 wherein the wing at each side of the fuselage has a root length which subtends said indentation at said side.

14. The combination of claim 11 wherein the tail tapers forwardly and rearwardly from zone of maximum thickness, with generally convex upper and lower surfaces designed to maintain a smooth, favorable pressure gradient condition from the slightly blunted leading edge, to locations as far aft along the tail as possible at subsonic design flight conditions.

15. In combination, an aircraft wing and fuselage, comprising
   a) said wing having camber at or near the wing leading edge which has blunted sharpness,
   b) the wing having leading edge low sweep angularity characterized in that crossflow instability is reduced to a subcritical level over the majority of the wing,
   c) the wing having thickness to chord ratio less than about 3% as a spanwise average, and
   d) said fuselage having indentations along the wing side thereof, and lengthwise of the fuselage, characterized in that fuselage and propulsion unit area ruling is defined,
   e) said wing leading edge having blunted sharpness along substantially its entire length where the bluntness at each spanwise station is about ½% to 3% of the maximum airfoil thickness at said station bluntness defined as h/t where h is the leading edge forward convexity diameter, and t is said maximum airfoil thickness.

* * * * *

UNITED STATES PATENT AND TRADEMARK OFFICE
CERTIFICATE OF CORRECTION

| | | |
|---|---|---|
| PATENT NO. | : 7,000,870 B2 | Page 1 of 7 |
| APPLICATION NO. | : 10/693411 | |
| DATED | : February 21, 2006 | |
| INVENTOR(S) | : Richard R. Tracy, James D. Chase and Ilan Kroo | |

It is certified that error appears in the above-identified patent and that said Letters Patent is hereby corrected as shown below:

The title page should be deleted and replaced with the attached title page.

Delete drawing sheets 1-5, consisting of Figs 1-8 and replace with the attached drawing sheets.

Signed and Sealed this

Twenty-seventh Day of June, 2006

JON W. DUDAS
*Director of the United States Patent and Trademark Office*

(12) United States Patent
Tracy et al.

(10) Patent No.: US 7,000,870 B2
(45) Date of Patent: Feb. 21, 2006

(54) LAMINAR FLOW WING FOR TRANSONIC CRUISE

(75) Inventors: Richard R. Tracy, Carson City, NV (US); James D. Chase, Reno, NV (US); Ilan Kroo, Stanford, CA (US)

(73) Assignee: Aerion Corporation, Reno, NV (US)

( * ) Notice: Subject to any disclaimer, the term of this patent is extended or adjusted under 35 U.S.C. 154(b) by 187 days.

(21) Appl. No.: 10/693,411

(22) Filed: Oct. 23, 2003

(65) Prior Publication Data

US 2004/0129837 A1 Jul. 8, 2004

Related U.S. Application Data

(60) Provisional application No. 60/424,039, filed on Nov. 7, 2002.

(51) Int. Cl.
B64C 1/38 (2006.01)

(52) U.S. Cl. .................. 244/130; 244/35 A; 244/204

(58) Field of Classification Search ............... 244/130, 244/36, 35 A, 35 R, 204, 45 R, 218
See application file for complete search history.

(56) References Cited

U.S. PATENT DOCUMENTS

| 2,709,052 | A | * | 5/1955 | Berg | 244/35 R |
| D179,348 | S | * | 12/1956 | Johnson | D12/337 |
| 5,322,242 | A | * | 6/1994 | Tracy | 244/36 |
| 5,518,204 | A | * | 5/1996 | Tracy | 244/36 |
| 5,842,666 | A | * | 12/1998 | Gerhardt et al. | 244/15 |
| 5,897,076 | A | * | 4/1999 | Tracy | 244/117 A |
| 6,149,101 | A | * | 11/2000 | Tracy | 244/130 |

* cited by examiner

Primary Examiner—Peter M. Poon
Assistant Examiner—Timothy D. Collins
(74) Attorney, Agent, or Firm—William W. Haefliger

(57) ABSTRACT

In combination, an aircraft wing and fuselage, comprising the wing having camber at or near the wing leading edge which has blunted sharpness and low sweep angle, and the fuselage having indentation along the wing side thereof, and lengthwise of the fuselage.

15 Claims, 5 Drawing Sheets

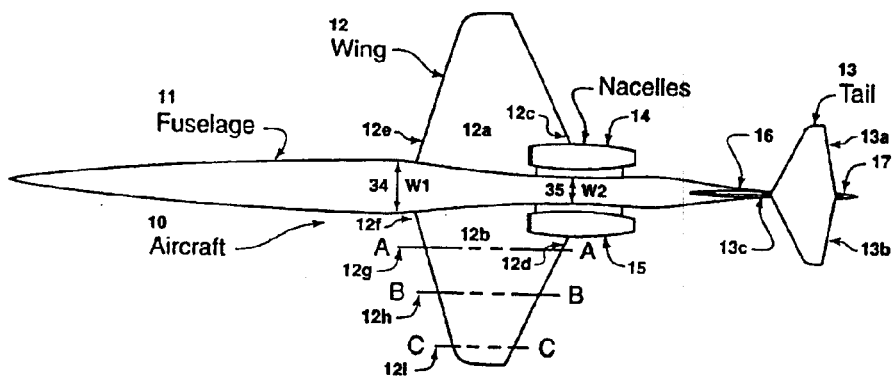

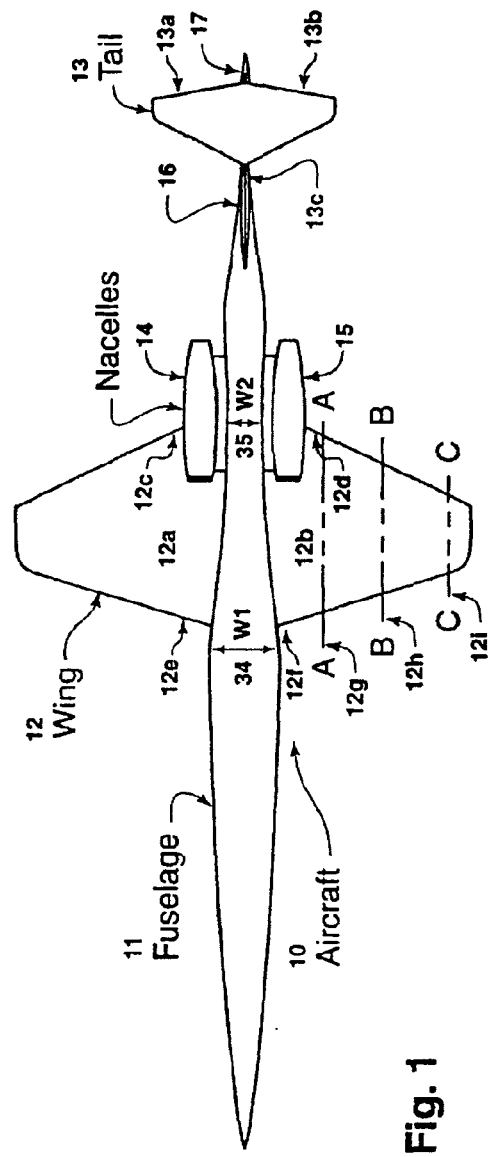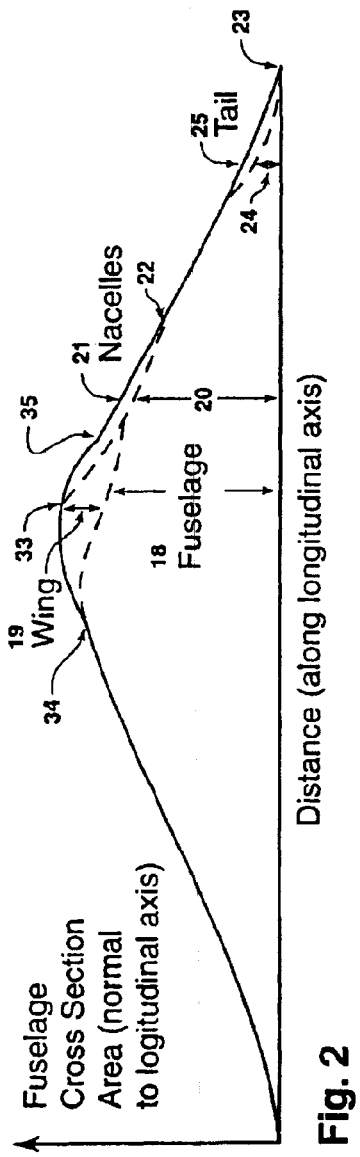
Fig. 1
Fig. 2

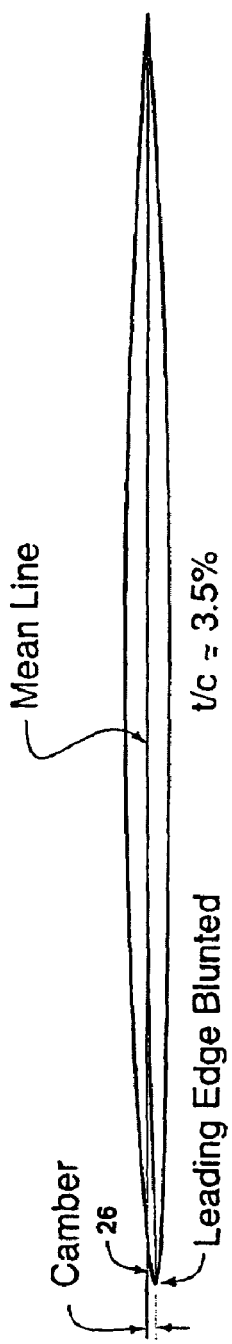
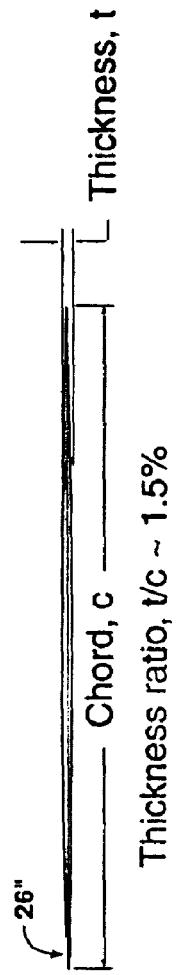
Fig. 3 — Airfoil Section A-A (near root), t/c ≈ 3.5%, Camber, Mean Line, Leading Edge Blunted
Fig. 4 — Airfoil Section B-B, t/c ≈ 2.5%
Fig. 5 — Airfoil Section C-C, Thickness ratio, t/c ≈ 1.5%, Chord, c, Thickness, t Detail of Leading Edge of Fig. 3